(12) United States Patent
Moore, Jr. et al.

(10) Patent No.: US 6,290,528 B1
(45) Date of Patent: Sep. 18, 2001

(54) ELECTRIC POWER SUPPLY CONNECTOR FOR SEALED COMPRESSOR

(75) Inventors: Billy W. Moore, Jr., Hot Springs; Scott E. Westberg, Arkadelphia, both of AR (US)

(73) Assignee: Carrier Corporation, Syracuse, NY (US)

(*) Notice: Subject to any disclaimer, the term of this patent is extended or adjusted under 35 U.S.C. 154(b) by 0 days.

(21) Appl. No.: 09/115,463

(22) Filed: Jul. 14, 1998

(51) Int. Cl.$^7$ .................................................. H01R 13/62
(52) U.S. Cl. ............................................ 439/367; 439/271
(58) Field of Search ................................. 439/521, 559, 439/564, 367, 685, 638, 639, 689, 690, 271, 718

(56) References Cited

U.S. PATENT DOCUMENTS

| | | | |
|---|---|---|---|
| 4,059,325 | 11/1977 | Diminnie et al. | 174/152 |
| 4,109,992 | 8/1978 | Hughes et al. . | |
| 4,227,764 | 10/1980 | Fiske | 174/58 |
| 4,252,394 | 2/1981 | Miller | 174/152 |
| 4,523,798 | 6/1985 | Barrows et al. | 439/521 |
| 4,584,433 | 4/1986 | Bowsky et al. | 174/152 |
| 4,654,470 | 3/1987 | Feldman et al. | 174/50 |
| 4,712,157 | 12/1987 | Simonson et al. | 361/357 |
| 4,827,502 | 5/1989 | Suffi et al. | 379/331 |
| 4,840,547 | 6/1989 | Fry | 439/892 |
| 4,915,638 | 4/1990 | Domian | 439/142 |
| 4,921,454 | 5/1990 | Atherton et al. | 439/685 |
| 4,984,973 | 1/1991 | Itameri-Kinter et al. | 439/693 |
| 4,998,891 | 3/1991 | Bresko | 439/369 |
| 5,007,854 | 4/1991 | Crespiatico et al. | 439/367 |
| 5,035,653 | 7/1991 | Honkomp et al. | 439/622 |
| 5,084,596 | 1/1992 | Borsh et al. | 174/54 |
| 5,091,821 | 2/1992 | Peyton | 361/380 |
| 5,120,237 | * 6/1992 | Fussell | 439/271 |
| 5,126,608 | 6/1992 | Sogabe et al. | 439/926 |
| 5,129,843 | 7/1992 | Bowsky et al. | 439/685 |
| 5,145,388 | 9/1992 | Brownlie et al. | 439/142 |
| 5,145,417 | 9/1992 | Honkomp et al. | 439/685 |
| 5,173,057 | 12/1992 | Bunch et al. | 439/217 |
| 5,194,012 | * 3/1993 | Cairns | 439/271 |
| 5,199,898 | 4/1993 | Wisner | 439/367 |
| 5,239,129 | 8/1993 | Ehrenfels | 174/51 |
| 5,244,408 | 9/1993 | Muller et al. | 439/460 |
| 5,252,083 | 10/1993 | Correnti | 439/147 |
| 5,256,072 | 10/1993 | Hatagishi | 439/79 |
| 5,272,297 | 12/1993 | Reichow et al. | 200/549 |
| 5,336,105 | 8/1994 | Wisner | 439/367 |
| 5,391,061 | 2/1995 | Iizuka et al. | 439/685 |
| 5,430,619 | 7/1995 | Lindenbaum | 361/823 |
| 5,769,659 | * 6/1998 | Ceylan | 439/521 |

* cited by examiner

Primary Examiner—Hien Vu
(74) Attorney, Agent, or Firm—Carlson, Gaskey & Olds

(57) ABSTRACT

A compressor is provided with a fluid tight electrical connector. The electrical connector is sealed against the compressor housing, and a cable is attached to the connector housing. Since the cable is separately attached to the connector housing, it is not directly connected to the electrical pins in the compressor. This reduces damage to those pins. Further, unique sealing arrangements make the electrical connection fluid tight.

15 Claims, 4 Drawing Sheets

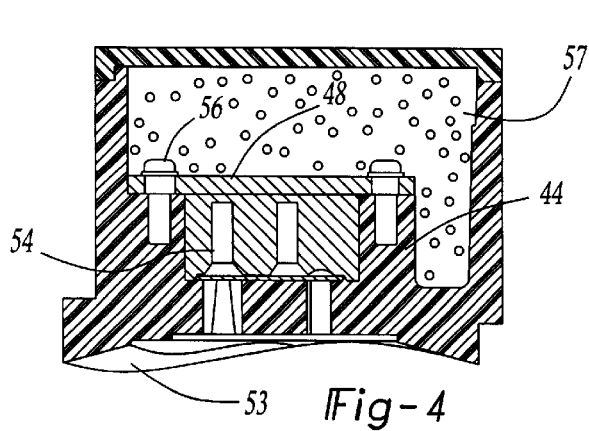
Fig-4
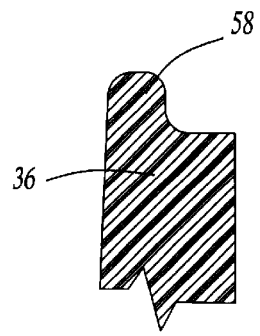
Fig-6
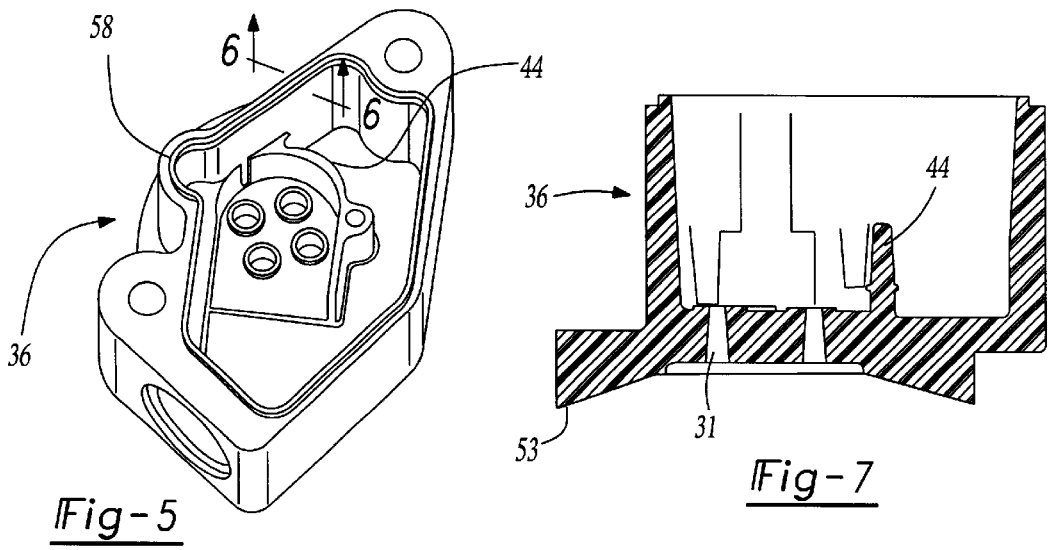
Fig-5
Fig-7
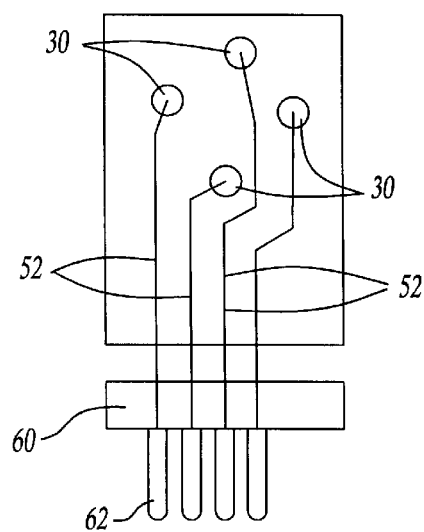
Fig-8
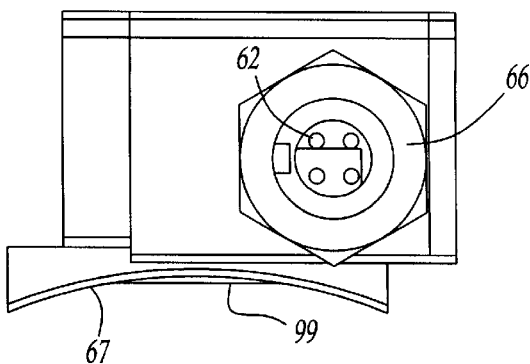
Fig-9

ELECTRIC POWER SUPPLY CONNECTOR FOR SEALED COMPRESSOR

BACKGROUND OF THE INVENTION

This invention relates to a sealed power supply connection for a sealed compressor canister.

Compressors are typically mounted within a sealed housing structure. The sealed housing structure receives a compressor pump unit and an electric motor for driving the compressor pump unit. Refrigerant and oil are allowed to flow within the compressor housing to perform various functions such as cooling the motor, etc. Due to this refrigerant fluid and vapor flow within the compressor housing, the housings must be fully fluid-tight.

There have been some challenges in connecting power supply connections to the compressor housing while still achieving a fluid-tight structure for the compressor housing. Typically, a series of terminal pins are mounted within a side wall of the connector. A cable has been connected to those terminal pins to supply power to the electric motor.

These connections have been deficient in several regards. First, there has not always been a fully fluid-tight connection at the connection of the connector housing.

In addition, the mount of the cable has typically been directly to the terminal pins. In this way, when the cable is removed from the connector, there has been damage to the terminal pin connections, since it is a single connector with fragile ceramic connectors.

Further, this type of connection has not been adaptable to applications where the compressor may sometimes be submerged in water.

SUMMARY OF THE INVENTION

In a disclosed embodiment of this invention, a separate connector housing is attached to a compressor housing wall. The cable is connected to a connection at one end of the housing, and the terminal pins from the connector housing are received within mating pin structure within the connector block. The connector block has appropriate circuitry for communicating the pins in the housing wall to the connectors for the cable at the other end of the connector. The connector housing is preferably attached to the connector wall with some mechanical attachment structure. In one embodiment, bolts are utilized. Preferably, bolt bosses are welded to the outer surface of the connector housing to receive the mechanical attachment bolts. The cable is separately connected to the connector housing such that when the cable is removed, there is no force on the terminal pins in the connector housing.

Structurally, the connector housing preferably includes an internal wall which receives a connector block to receive the terminal pins. This housing provides proper positioning for the terminal block such that the terminal block is properly received. A strap secures the terminal block within the housing wall. The terminal block is preferably formed with openings to receive the terminal pins from the compressor housing, and has appropriate circuitry connected to the terminal pins for the cable.

Further, sealing elements are preferably placed on the connector housing to surround the connection of the terminal pins within the compressor housing. Further sealing elements are placed in the housing at appropriate locations to define a fluid-tight seal. Also, the entire interior of the housing is preferably encased in a filler material such as a potting material, further enhancing the fluid-tight seal.

These and other features of the present invention can be best understood from the following specification and drawings, the following of which is a brief description.

BRIEF DESCRIPTION OF THE DRAWINGS

FIG. 4 is a cross-sectional view along a different plane from that of FIG. 3, and through the connector housing.

FIG. 5 shows a portion of the connector housing.

FIG. 6 is a cross-sectional view generally along lines 6—6 as shown in FIG. 5.

FIG. 7 is a view through a housing portion according to the present invention.

FIG. 8 schematically shows the connections of the present invention.

FIG. 9 is a bottom view of the connector housing.

A compressor 20 includes a housing shell 22 which seals a compressor pump unit and motor, as known. An electrical power connector housing 24 is attached to the housing shell 22. A cable 26 is secured to the connector housing 24 and supplies electrical power to the compressor 20.

Figure 1:
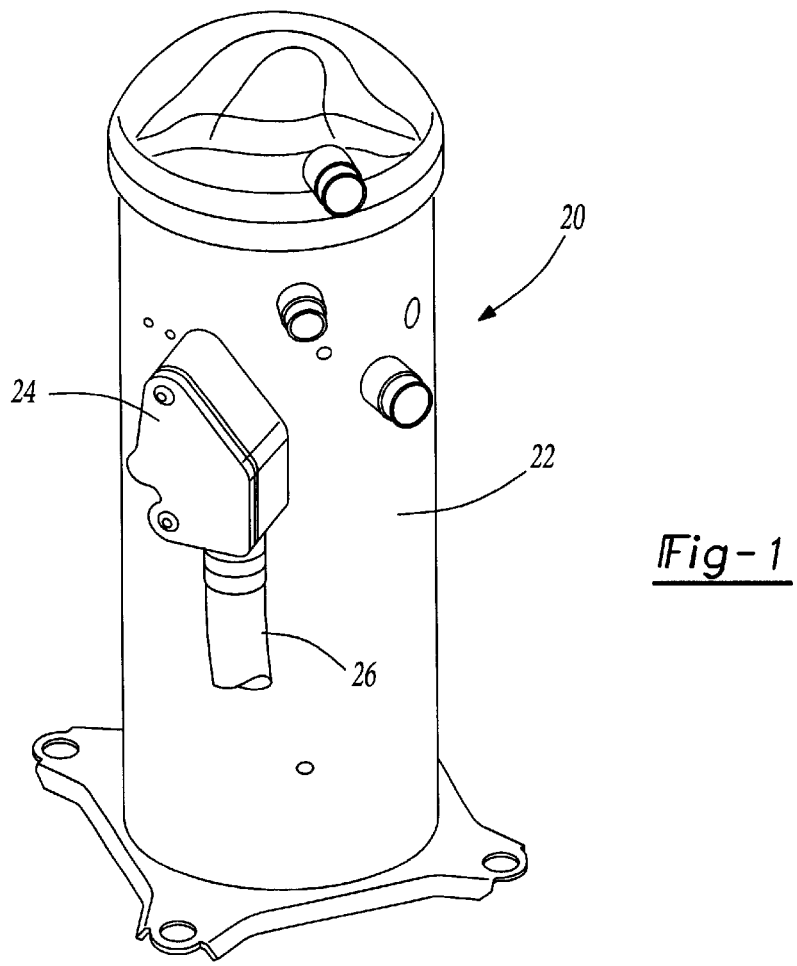
FIG. 1 is a perspective view of a compressor incorporated in the inventive connector housing.
Figure 2:
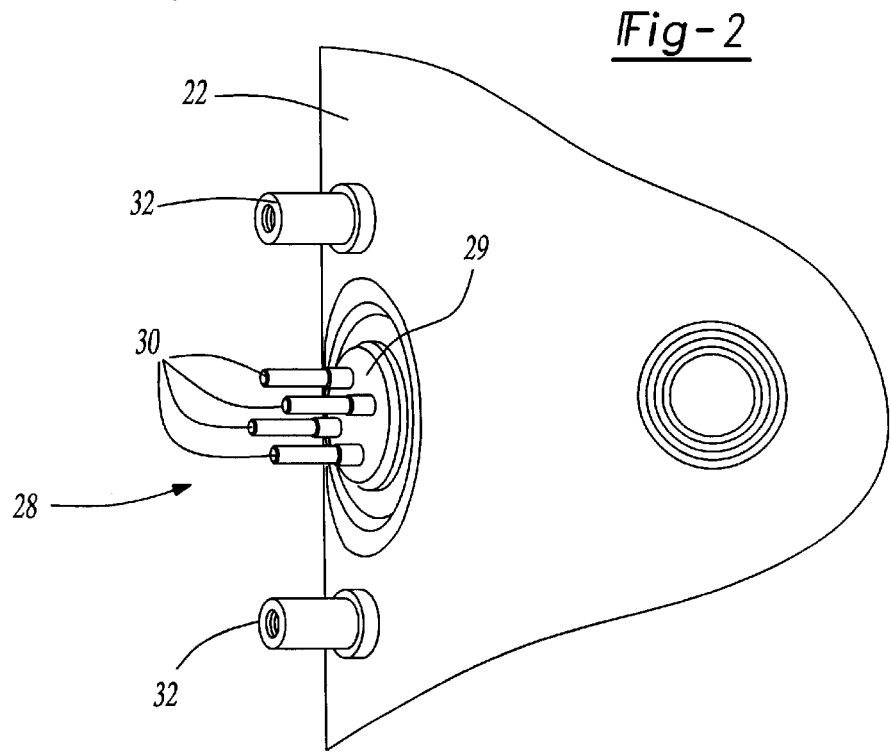
FIG. 2 is the compressor of FIG. 1 without the connector housing.

As shown in FIG. 2, the compressor housing 22 includes an electrical connection at 28. Connection 28 includes pins 30 received within a weld ring 29. The weld ring is welded to the housing shell 22 and pins 30 are connected to the motor. The structure of the pins is better described in co-pending patent application Ser. No. 09/105,135, entitled "INTEGRAL GROUND PIN FOR SEALED COMPRESSOR".

Figure 3:
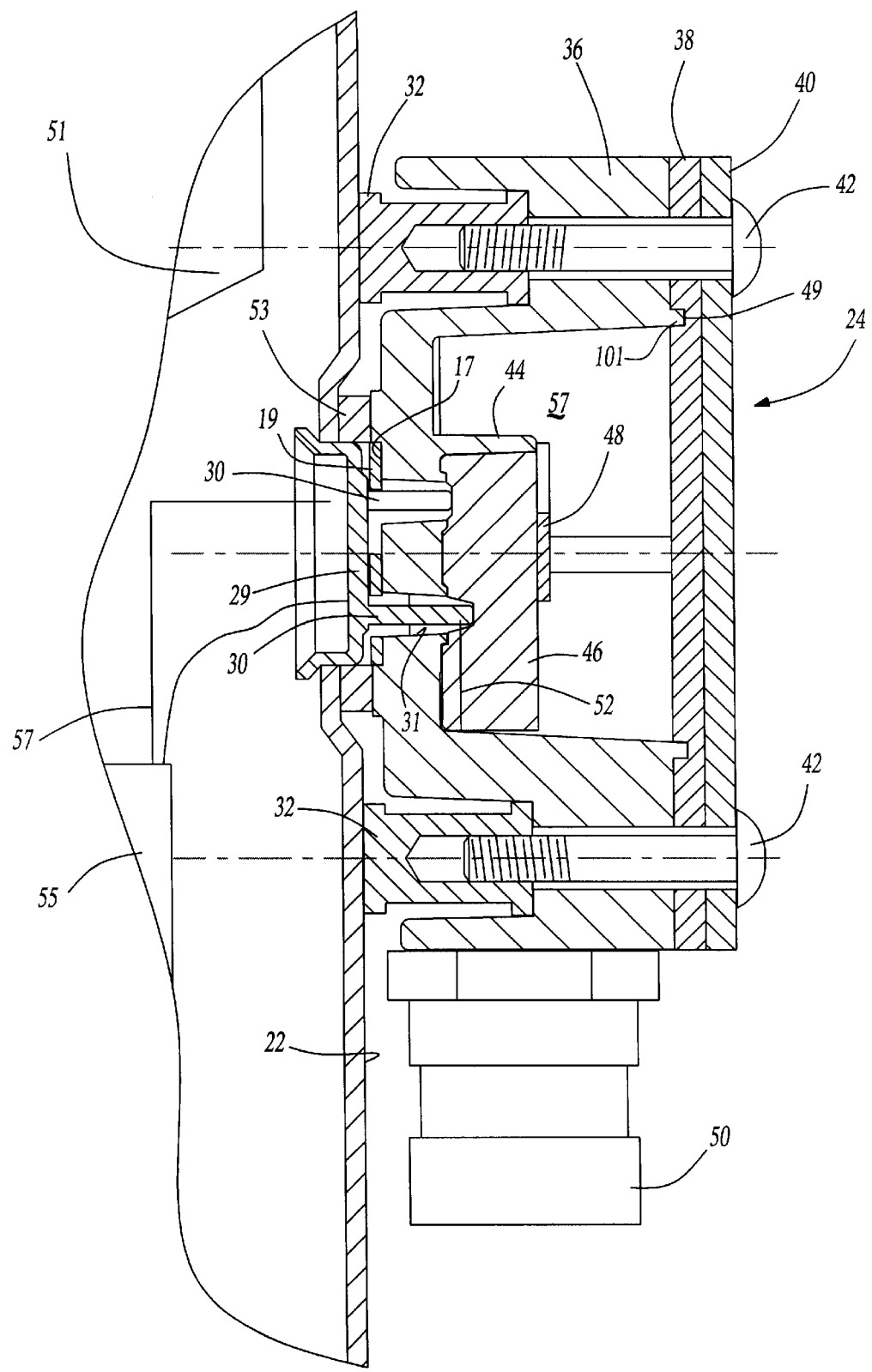
FIG. 3 is a cross-sectional view through the connector housing.

The connector housing 24 is shown attached to the compressor housing shell 22 in FIG. 3. As shown, the pins 30 extend through openings 31 in the connector housing. A main housing body 36 receives a cover 38 and 40, and bolts 42 extend into the bosses 32 to secure the connector 24 to the housing. An internal wall 44 receives a block 46 which communicates electrical signals from the pins 32 to the cable 26, as will be explained below. A strap 48 secures the block 46 within the housing. The space surrounding the block and strap is filled with a filler malarial 57, such as an epoxy potting material. A groove 49 of the main housing 36 is supplied within a tough epoxy sealant, such that the connection between the main housing 36 and the covers 38 and 40 provides a fluid tight seal. The drawings schematically show a compressor pump 51 which is driven by a motor 55. A power supply supplies power from the pins 30 to the wires 157, and through to the motor 55. The power supply is preferably a three-phase power supply, and preferably there are four pins, with one of the pins supplying a ground. This is the invention of the above-referenced patent application. A seal 53 seals between a forward face of the main housing body 36 and the outer compressor housing 22. A space 17 spaces weld ring 29 from the main body housing 36. The combination of all of the sealing provides a fluid type seal such that this compressor could be placed in a submerged location, and yet water would not leak into the connector. A separate cable connector member 50 is inserted into the main housing body 36, and includes appropriate seals for providing a fluid type seal between the cable 26 and the cable connector 50. Again, the fluid type seal will allow the entire compressor will be submerged. Since the cable is connected to a separate part, it can be easily removed without applying any force to the pins 30. Thus, damage which may have occurred in the past is avoided.

Weld bosses 32 are welded to the other surface of the housing 22 and receive bolts to connect the connector housing 24, as will be described below.

FIG. 4 shows housing 24 including a flat for sealing ring 53 which seals on the outer surface of the compressor housing 22. A wall 44 receives bolts 56 to secure the strap 48. A plurality of openings 54 are formed within block 36 to receive the pins 30. As shown, potting material 57 fills the housing 24.

FIG. 5 shows the wall 44 within the interior of the connector housing portion 36. A sealing lip 58 surrounds an opening into the main connector body 36. The cover 40 is received on the housing member 36 to close this opening. The sealing lip 58 provides a fluid type seal at that connection.

As shown in FIG. 6, the sealing lip 58 extends outwardly of member 36.

As shown in FIG. 7, a sealing element 53 surrounds the inner surface of the housing member 36.

FIG. 8 schematically shows the connector block 46 receiving the pins 30. Appropriate wiring 52 connects the pins 30 to a cable connector 60 having associated pin 62. Although pins are shown at both 30 and 62, it should be understood that either or both of these elements could be receptors rather than the pin elements.

FIG. 9 shows the housing 36, and the cable connector 60 including the pins 62. The curved surface 67 of the housing 36 faces the outer periphery of the curved housing 22 and provides a splash guard. Since the inventive compressor may well be utilized in applications where it will be exposed to water, the splash guard prevents water from reaching the seal between the connector housing and the compressor housing. The inventive connector is especially directed to compressors which are utilized in refrigeration transport containers. That is, refrigerated containers transported on boats, etc. Such compressors may well be exposed to water, and the invention is thus directed to providing a very good seal for this application.

As can be seen in FIG. 9, there is a flat surface 99 radially inwardly of the curved surface 67. That flat surface receives the seal 53 such as shown in FIG. 3. The combination of the flat surface and the curved surface ensure that there is a fluid tight seal at the compressor housing, and that that seal is not exposed to an undue amount of water due to the splash guard of the curved surface 67.

Figure 10:
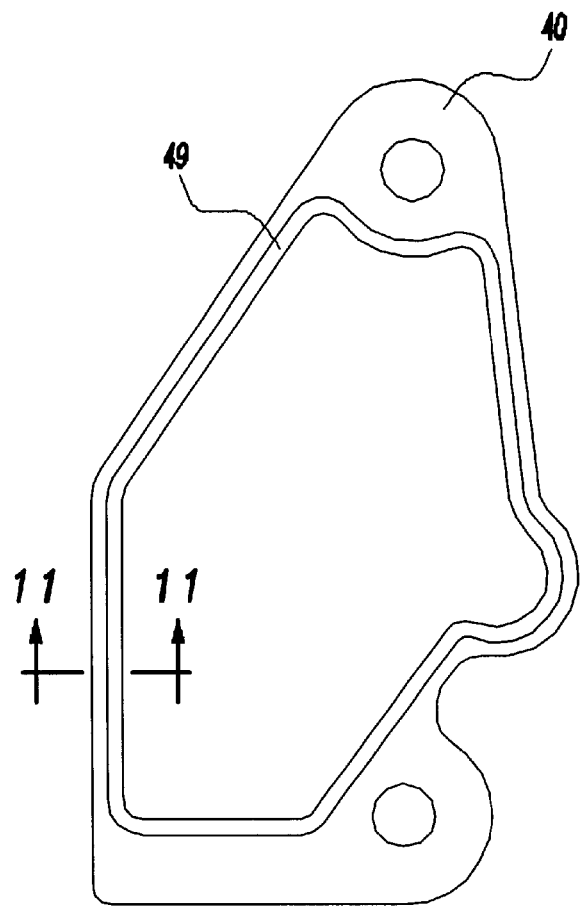
FIG. 10 shows the housing lid.
Figure 11:
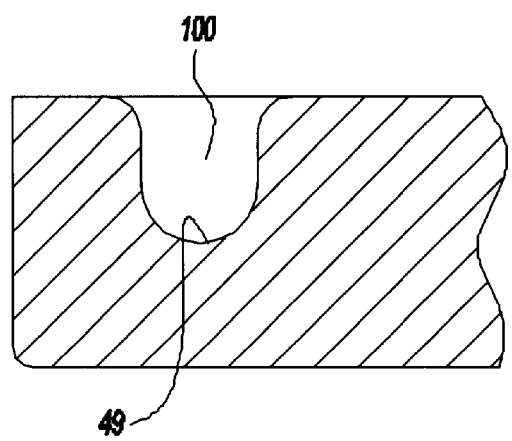
FIG. 11 is a cross-sectional view along line 11—11 of FIG. 10.

FIG. 10 shows lid 40. As shown, groove 49 surrounds the periphery of the lid. A sealant, preferably an epoxy sealant 100 is placed in the groove 49 before the lid is placed on the main housing. The groove and sealant then seals on to the tongue 101 on the main housing such as shown in FIG. 3.

While an epoxy is the preferred filler material in this application, other filler materials such as RTB, silicone materials, etc., can be utilized.

A preferred embodiment of this invention has been disclosed; however, a worker of ordinary skill in the art would recognize that certain modifications come within the scope of this invention. For that reason, the following claims should be studied to determine the true scope and content of this invention.

What is claimed is:

1. A sealed compressor comprising:
   a compressor pump unit and a motor for driving said compressor pump unit;
   a housing surrounding said compressor pump unit and said motor and providing a fluid tight enclosure;
   a power supply connector for communicating a power supply to said motor, said power supply connector being mounted within said housing wall;
   a connector housing for connecting to said power supply connector and to a cable for supplying power to said power supply connector, said connector housing enclosing a plurality or first electrical connections received on said power supply connector in said housing wall, and a plurality of second electrical connections providing a plug to be connected to connectors from a cable, said connector housing including at least three connections for supplying three power phases to said electrical connector supply, and mechanical attachment elements for connecting said connector housing to said compressor housing, and allowing the cable to be removably connected and disconnected to said second electrical connections without removing said connector housing, such that said power supply connector is not disconnected from said plurality of first electrical connections when said cable is disconnected; and
   said connector housing includes a main connector body and a cover, and said mechanical attachment members to secure both said cover and said main connector body to said compressor housing; said compressor housing including a plurality of bosses extending from an outer wall of said compressor housing for receiving said mechanical attachment members.

2. A compressor as recited in claim 1, wherein said mechanical attachment members are threaded bolts and said bosses include threads to receive said bolts.

3. A compressor as recited in claim 1, wherein said first electrical connections extend into openings in a terminal connection body, said terminal connection body communicating electrical power from said second electrical connections to said first electrical connections.

4. A compressor as recited in claim 3, wherein said connector housing includes an internal wall for guidably supporting said terminal connection body.

5. A compressor as recited in claim 4, wherein a strap is secured to said wall to secure said terminal connection body within said connector housing.

6. A connector as recited in claim 5, wherein said terminal connection body includes a plurality of openings which receive electrical supply pins.

7. A compressor as recited in claim 1, wherein said cable is connected to said second electrical connectors, and said second electrical connections being received within said connector housing, but being a separate component.

8. A compressor as recited in claim 1, wherein at least a portion of said connector housing has a curved surface facing said compressor housing, and said compressor housing having a curved surface such that said connector housing curved surface faces said compressor outer housing and serves as a splash guard.

9. A compressor as recited in claim 1, wherein an interior of said connector housing is provided with a filler material to seal the electrical connections.

10. A compressor as recited in claim 9, wherein said filler material is an epoxy potting material.

11. A compressor as recited in claim 1, wherein a seal is provided between said connector housing and said compressor housing around said first electrical connections.

12. A compressor as recited in claim 1, wherein said housing is covered by a lid, one of said housing and said lid having a groove and the other having a tongue fitting into said groove, a sealant being placed between said tongue and said groove.

13. A sealed compressor comprising:

a compressor pump unit and a motor for driving said compressor pump unit;

a housing surrounding said compressor pump unit and said motor and providing a fluid tight enclosure;

a power supply connector for communicating a power supply to said motor, said power supply connector being mounted within said housing wall;

a connector housing for connecting to said power supply connector and to a cable for supplying power to said power supply connector, said connector housing enclosing a plurality of first electrical connections received on said power supply connector in said housing wall, and a plurality of second electrical connections providing a plug to be connected to connectors from a cable, said connector housing including at least three connections for supplying three power phases to said electrical connector supply, and mechanical attachment elements for connecting said connector housing to said compressor housing and allowing the cable to be removably connected and disconnected to said second electrical connections without removing said connector housing, such that said power supply connector is not disconnected from said plurality of first electrical connections when said cable is disconnected;

at least a portion of said connector housing having a cured surface facing said compressor housing, and said compressor housing having a curved surface such that said connector housing curved surface faces said compressor outer housing and serves as a splash guard; and wherein a planar surface is positioned radially inwardly of said curved surface, said planar surface receiving a seal, said seal being in contact with said compressor housing.

14. A compressor as recited in claim 13, wherein said connector housing includes a main connector body and a cover, and said mechanical attachment members to secure both said cover and said main connector body to said compressor housing.

15. A compressor as recited in claim 13, wherein said seal being provided around said first electrical connections.

\* \* \* \* \*